Patented July 19, 1927.

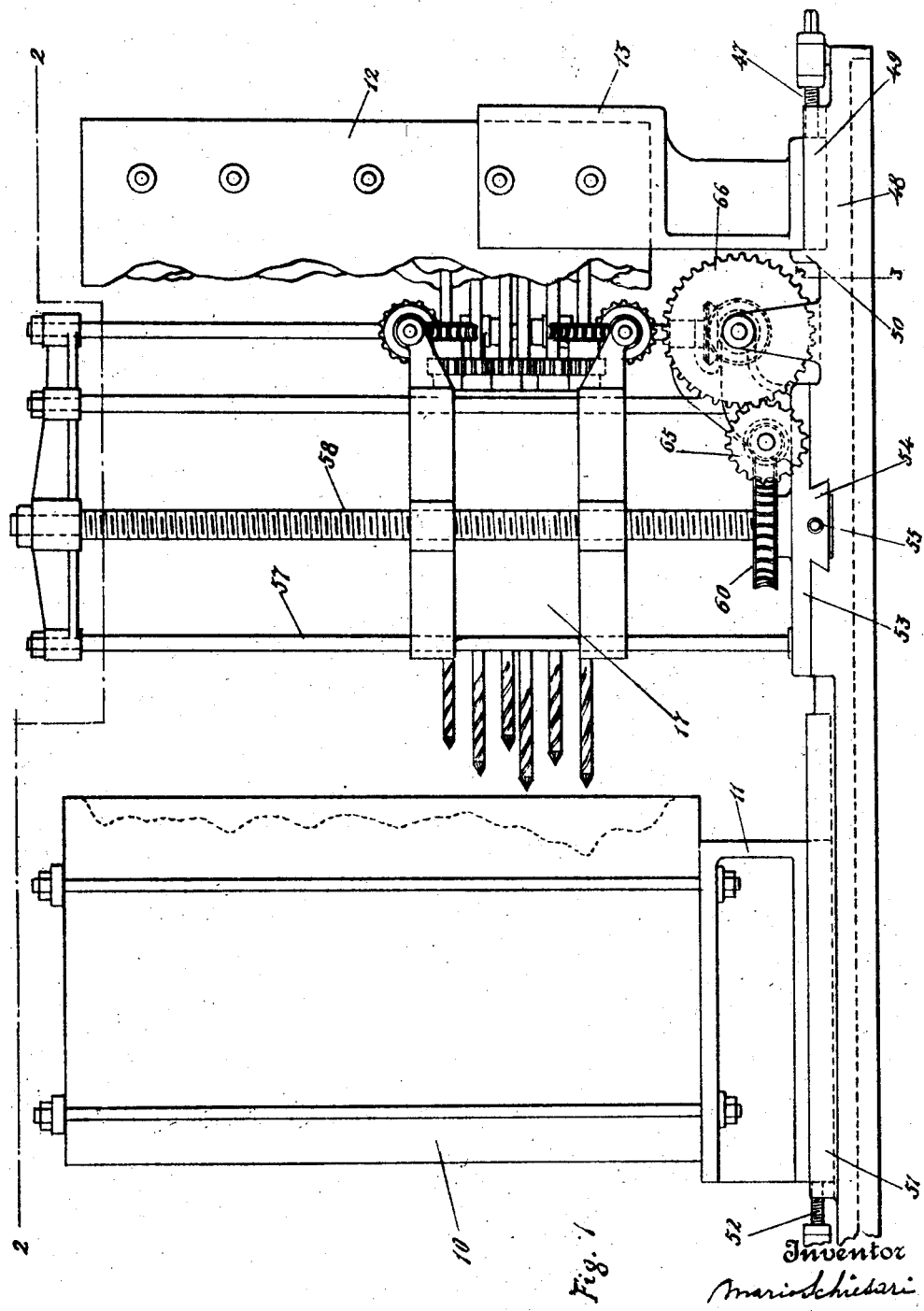

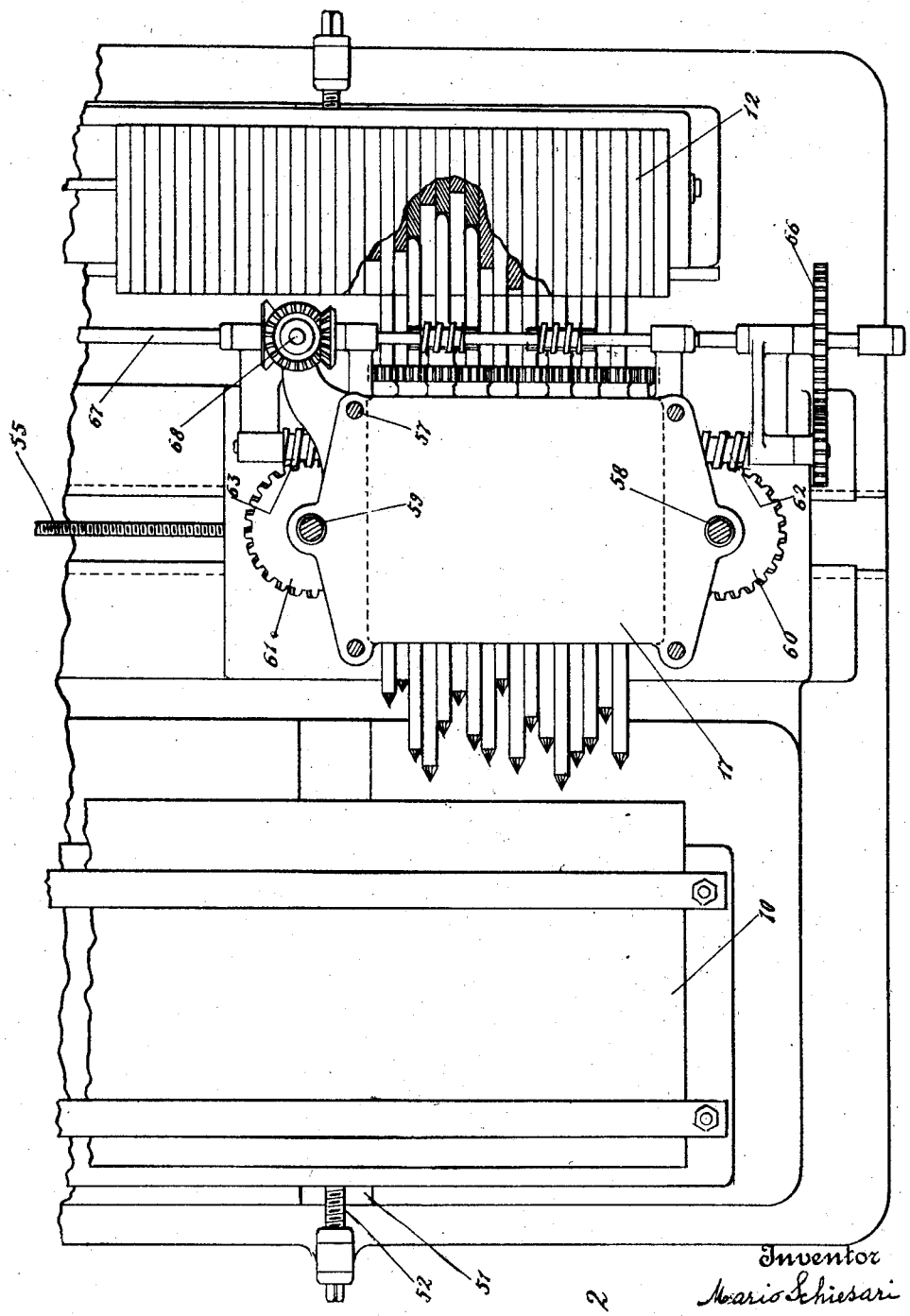

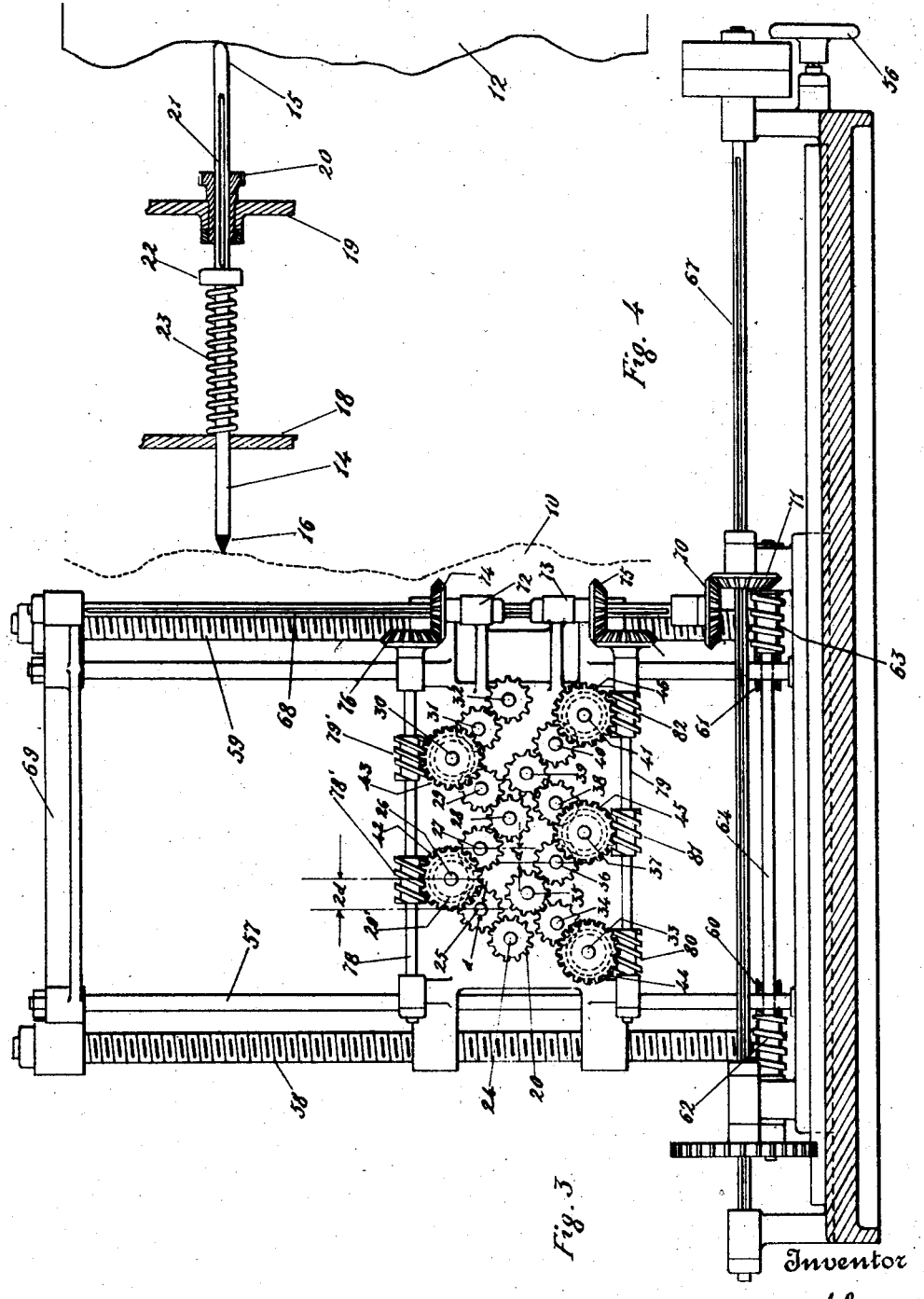

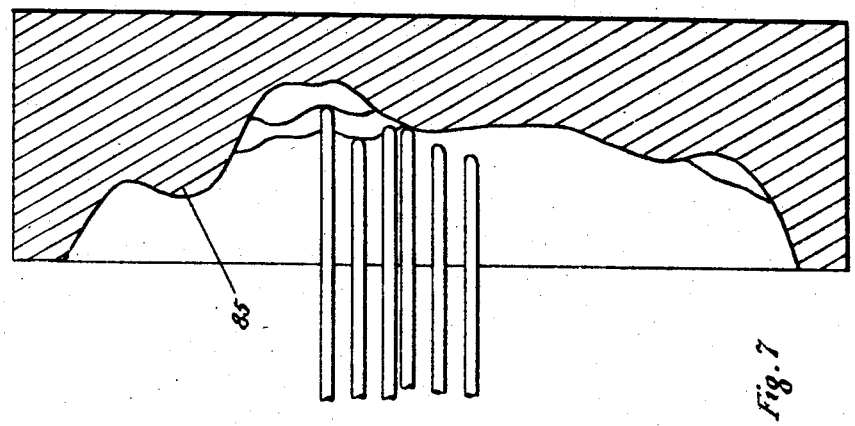
Fig. 7
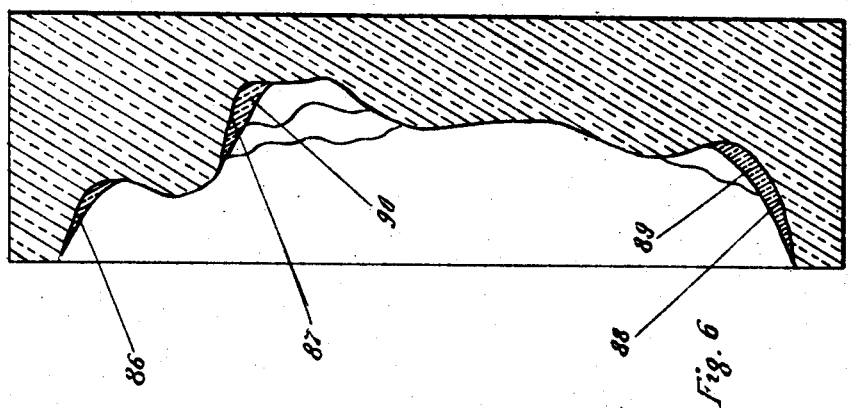
Fig. 5  Fig. 6
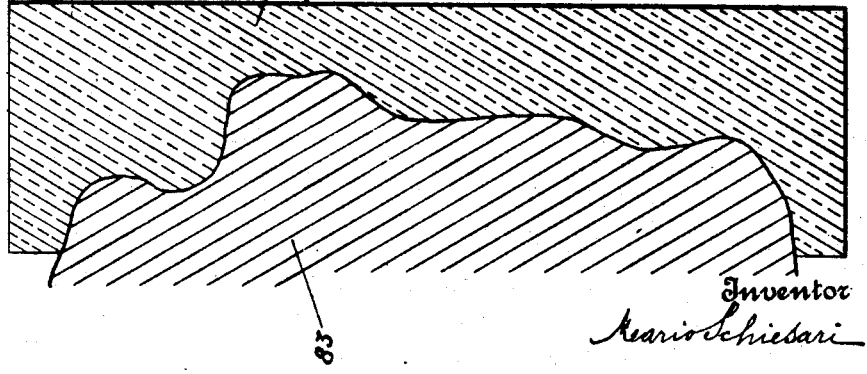

1,636,149

UNITED STATES PATENT OFFICE.

MARIO SCHIESARI, OF NEW YORK, N. Y.

METHOD OF AND APPARATUS FOR MAKING SCULPTURES.

Application filed February 5, 1924. Serial No. 690,776.

This invention relates to a novel and improved method for reproducing sculptures and other three dimensional objects, and to apparatus for carrying the method into practice; and its main object is to provide a novel method of collectively operating a plurality of sculpturing or carving tools, greatly reducing the time required by the same class of work, performed by other methods heretofore in use.

Another object of this invention is to provide a novel method of procedure in the preparation of the necessary means for controlling the tools while the work is being done, having certain advantages over other methods, which will be pointed out in detail in the description which follows.

A further object is to provide a novel and improved type of apparatus, whereby sculptures and the like may be produced according to my method, in a relatively short time, and without the necessity of employing special, or above the average skill.

A still further object is to provide a special arrangement of sculpturing or carving tools, and driving means therefor, whereby a plurality of tools may be simultaneously operated by the same source of motive power.

With these and other objects in view, as will more fully appear as the description proceeds, this invention furthermore comprises certain novel and improved constructions and arrangements of parts, as will be hereinafter fully described, and particularly pointed out in the appended claims.

Machines for reproducing sculptures have heretofore been made, where a mechanically operated cutting or carving tool is guided to move so as to follow the movements of a tracking member held against the surface of the object, such as a statue, being reproduced.

More recently a process has come to my notice, where diagrams obtained by means of a tracking member, are used instead of the original model, to guide a tracking member in its turn controlling the movements of a carving tool.

In this process, no invention of which is claimed by me, the various diagrams or profiles are traced on a flat surface, such as a sheet of paper, and the work is carried out by the operator moving a sharp pointed object used as a tracking member, to follow the lines of the diagram; suitable means being provided for associating the cutting or carving tool to said tracking member in such a manner that the movements of the tracking member will be faithfully reproduced in the same or on a different scale, by the tool employed to work on the raw material, such as a block of marble, from which the reproduction has to be made.

All the methods for sculpture reproduction which have come to my notice, are based on the employment of a single tool, and require the constant attention of the operator while the work is being performed.

By means of my invention I have sought to improve on the previous methods, by causing the reproducing operation to be semi-automatic, or almost entirely automatic, so that the work may be carried out with a minimum amount of attention; and furthermore, by employing special methods and arrangements, I have greatly reduced the time necessary by other methods, so that the work may be carried out at great speed.

The method of reproduction by means of diagrams constitutes a great improvement over other methods, permitting, as it does, the reproduction of a three dimensional object without the original being actually available. The profiles may be marked or printed on a sheet of paper, and the same may be produced in any quantity, so that reproductions by means of the same may be obtained at any time or place, and in any desired scale.

My preferred method is based to a certain extent on the same principle, by employing profiles obtained by moving a tracking stylus over the surface of the object to be reproduced, at equally distanced intervals; the totality of the profiles thus obtained forming, collectively, the diagram of the object.

By my method, however, each profile is pasted or otherwise reported on a surface of suitably hard material, such as sheet metal, having a thickness, preferably, corresponding to the spacing between two adjoining profiles in the reproduction. If the reproduction is of the same size as the original, this thickness will be the same as the distance between two successive profiles on the original model; and if the reproduction is larger, or smaller than the original, the thickness will be accordingly increased or decreased.

The sheets are then sawed following the profiles reported on their surfaces, so that solid profiles are obtained of a predetermined thickness, which, according to my method, may be used to directly control the movements of the carving tool or tools.

If the solid profiles thus obtained are assembled side by side, they will form, in their totality, a negative reproduction of the surface of the original model.

Such a negative reproduction, however, whether subdivided in a plurality of solid profiles, or in one piece, can also be obtained simply by reversing the process whereby the reproductions are produced, as will hereinafter be more clearly explained.

It is now obvious, that if a suitable tool, for instance a rotating carving tool is held with its rear end against the surface of one of the said profiles, and is caused to travel from one end of the profile to the other, its outer end will produce, in the material out of which the reproduction is made, a positive outline of the said profile. If the same operation is repeated now for the next profile, and so on successively for all the profiles, the result will be a positive reproduction of the model from which the profiles were obtained.

By my method, I therefore employ suitable means whereby the rear end of the carving tool is held against the surface of the profile back of it, and other means whereby said tool is caused to travel along the surface of the said profile, while being rotated or otherwise operated for cutting or carving into the material employed.

An additional feature of my method of reproduction, is the simultaneous operation of a plurality of carving tools, each following the outline of the profile or pattern at its rear, and each adapted to operate independently of the others. I prefer to space said tools so that their relative lines of operation are distanced so as to correspond to the thickness of the solid profiles, if profiles are employed; or, in other words, I prefer to arrange said tools in such a manner that the plurality of their lines of operation will constitute a solid slice, the entire surface of which is operated on at the same time by all the tools, in carrying out the work. It is obvious that by this method the work will be produced in a much shorter time than if only one tool is employed; and since by my method a considerable number of tools may be simultaneously operated, the time required is in practice reduced to a mere fraction of the time originally employed.

It appears therefore, that the method forming the principal object of this invention, I accomplish two important main purposes, i. e., the provision of a mode of operation and control of the carving tool or tools permitting of carrying out the work under the guidance of solely mechanical factors, which may be translated into semi-automatic, or entirely automatic conditions; and the provision of a novel and improved arrangement of a plurality of carving tools, permitting their simultaneous operation under the semi-automatic or entirely automatic conditions mentioned.

Owing to the vast variety of work in connection with which my method may be usefully employed, it is obvious that the principles on which the same is based may be translated and embodied in machines and apparatus of vastly different character; for instance, while the work of reproducing a sculpture in a block of marble which may be mounted on a movable platform, and that of reproducing the same sculpture at the side of a building is intrinsically the same, the apparatus used must necessarily be different, in view of the stationary character of the building, and owing to the fact that while in one case the work may be taken to the machine, in the other case the machine must be taken to the work. The same considerations will apply to the selection and use of a suitable source of motive power. Other factors, such as the nature of the material used, the size of the work to be produced, etc., influence to a great extent the design of the apparatus to be used; and therefore I have not attempted to give a complete illustration of all the types of machines embodying my invention, but I have confined the annexed drawings to the presentation of a simple, nonautomatic type of machine, such as I consider sufficient to illustrate my method, and the main features of the apparatus used.

The drawings are therefore intended for illustrative purposes only, and not in a limiting sense, since it is obvious that various movements of parts of the machine which appear to be under the control of the operator, and subject to the operator's performance, may easily be effected by automatic control, by employing any one means or combination of means well known to a competent engineer or designer.

Such automatic control means have purposely been omitted from the present illustration, for the sake of simplicity and clarity, the essential features of the method itself, however, being illustrated in full.

Referring to the drawings:

Fig. 1 is a side view in elevation of a stationary type of machine embodying my invention;

Fig. 2 is a fragmentary plan view of the same, partly sectioned;

Fig. 3 is a sectional rear view in elevation of the same, through line 3—3 of Fig. 1;

Fig. 4 is a detail sectional side view in elevation showing the mode of operation of one of the carving tools employed;

Fig. 5 is a side sectional view in elevation illustrating the first step in an alternative method of producing a negative cast of the work to be reproduced;

Fig. 6 is a side sectional view in elevation illustrating a subsequent step of the same method; and, Fig. 7 is a side sectional view in elevation of a cast obtained by said method, showing its mode of operation in connection with a plurality of carving tools.

Figs. 1, 2, 3, illustrate a machine reproducing a given piece of work on a block of marble 10, mounted on a movable platform 11, using the negative of said work formed by a plurality of profiles 12 mounted side by side. Said profiles are constituted by boards or slats vertically arranged on a bed or holder 13, having their inner edge constituting the profile proper, to be reproduced, inverted, on the block of marble.

The elementary principle of reproduction of each profile is illustrated in Fig. 4, where 12 designates the profile, 10 the block of marble. If a suitable carving tool, 14, adapted to exert a cutting, or milling, or abrasive action on the marble, for instance by being rotated at high speed, is held with its rear end 15 against the inner edge of the profile, while being caused to travel in a vertical plane, its front or working end, 16, will produce on the block of marble an outline, which is shown in dotted lines, which is an exact counterpart of the outline of the profile. Said outline may be produced at one stroke, or during several travels of the tool in one or the other direction, according to conditions to be met; and the depth of the groove cut by the tool into the marble may obviously be controlled by feeding the work towards the tool after each completed stroke, or vice-versa.

In practice, the tool may be mounted on a carrier capable of longitudinal travel in relation to the profile, said carrier being designated by numeral 17 in Figs. 1, 2, 3, and being formed with a front wall 18 and a rear wall 19. A gear, 20 (Fig. 4), is shown rotatably mounted in rear wall 19, and the tool, 14, is shown inserted through said gear, constrained to follow its rotation by a feather key 21, but free to move in an axial direction.

The tool is provided, within the carrier, with a collar 22, against which the pressure of a spring 23, abutting against the front wall 18, is exerted. Owing to said spring, therefore, the tool is maintained with its rear end 15 abutting against the profile, as shown in the drawing, throughout the length of the travel of the carrier. During said travel, the tool will obviously be forced outwardly by the spring wherever a recess of the profile allows it, and vice-versa, it will be forced inwardly by the profile wherever a projection, or an outward slant of the profile occurs; and the result, as stated, will be the carving by the tool of an inverted profile in the block 10, as shown in dotted lines in Fig. 4.

By causing the vertical travel of the carrier, therefore, the action of the tool becomes automatically controlled by the profile, and no guiding action on the part of the operator is necessary. This is a marked advantage over such methods as have come to my notice, where the tool must be guided by the operator moving a guiding instrument to follow the lines of the diagram.

As stated above, another important feature of my invention, is the simultaneous operation of a plurality of cutting or carving tools, whereby an entire section of surface may be worked at one time. To this end, I arrange the tools so that while their operation is simultaneous, their respective axial movements are independent of each other, so that each tool may perform its work independently of the others.

The tools may collectively be mounted on a carrier, such as illustrated, and operated by their respective profiles in the manner shown in Fig. 4. However, the gear or other rotatable element mounted on the tool and operating the same, is necessarily of a diameter considerably larger than the diameter of the tool itself. To allow for proper clearance, if the tools are arranged on the same horizontal plane, a series of non adjacent grooves will have to be produced, the distance between two consecutive grooves being say four or five or more times the width of a single groove.

By this kind of arrangement, the work may be completed by moving the carrier transversely to the work of one step at a time corresponding to the width of a single groove (which corresponds to the working width of the tools), each time a set of grooves has been completed; until finally all the clearances between the originally produced grooves will have been simultaneously, by degrees, worked out.

However, I prefer to adopt an arrangement which permits the use of a greater number of tools without increasing the width of the carrier, and which permits, in fact, of simultaneously working adjacent zones or strips of the work, forming in their totality a complete section of its surface. A typical example of such an arrangement is shown in Figs. 1, 2, 3, where the carrier, 17, is shown provided with a plurality of tools, the lateral distance between center and center of which corresponds to the width of one tool. At the same time, the actual distance between center and center of adjacent tools is such as to allow for the diameters of the gears by which the tools are driven, which are preferably in mesh with each other.

For convenience, the tools are thus arranged on alternately upwardly and downwardly inclined rows, forming what I will call a saw-tooth arrangement. If preferred, the tools are arranged, as shown, in two sawtooth rows, the lateral distance between adjacent tools of the same row being twice the width of a single tool, so as to produce a succession of grooves with a blank space between corresponding to the same width; and the tools of the other row being arranged at the same lateral distance, but in a staggered relation to the tools of the former row, so that said tools will work the blank spaces left untouched by the former row, and will thus complete the section of surface being worked at one time.

Such an arrangement will be clearly understood, by referring to Fig. 3, where the tools of the upper saw-tooth row are designated by numerals 24, 25, 26, 27, 28, 29, 30, 31, 32, and the tools of the lower row are designated by numerals 33, 34, 35, 36, 37, 38, 39, 40, 41.

The distance between two consecutive tools of the same row, in a lateral sense, is $2d$, as indicated, $d$ being the working diameter of one tool; and the tools in the two rows being in a staggered relation, the lateral distance between two consecutive grooves or strips operated on by the tools will be $d$, as indicated.

I provide one, or a number of primary driving gears 42, 43, in the upper row, and 44, 45, 46 in the lower row, driving the tools coaxial therewith 27, 30, 33, 37, 41, and transmitting their motion to the gears 20 mounted on the other tools by means of similar gears 20' integral with gears 42, 43, 44, 45, 46; so that gears 20, 20' constitute a continuous chain of gears in mesh with each other, for each saw-tooth row, causing consecutive tools in the same row to rotate in opposite directions. The cutting ends of the tools will therefore be arranged accordingly.

It will now be seen, that if the solid profiles, the thickness of which corresponds to the diameter of the tools, are arranged side by side, back of said tools, as shown in plan in Fig. 2, the tools being held with their rear ends against the surface of their respective profiles by a suitable arrangement, such as shown for instance in Fig. 4; and the carrier 17 is caused to travel in a longitudinal relation to said profiles, the working ends of the tools will carve a strip or section, the width of which corresponds to the width of the tools taken in their totality.

The depth of the work may be gradually increased, by moving the work towards the tools, or vice-versa, each time a longitudinal travel of the carrier has been completed, until the entire set of profiles has been reproduced.

Let us now see, how the work may be performed by a machine such as illustrated in Figs. 1, 2, 3. In the same, as stated, 12 represents a set of profiles arranged side by side on a support 13, directly back of the tools carried by carrier 17 in the manner just explained.

The support or holder 13 may be moved away from the rear end of the tools, by means of an adjusting screw 47, said support 13 being mounted on the bed 48 of the machine by means of a dove-tailed sliding connection 49; so that when the support, and the profiles carried thereby are moved outwardly, clearing the rear ends of the tools, the carrier may be set at any position in a crosswise direction. When the carrier has thus been set at the desired point, support 13 is again advanced, its working position being preferably fixed, and determined by a stop 50, against which it is moved by screw 47.

In a similar manner, the block of marble or other material 10, is movable towards or away from the working ends of the tools, being mounted on a movable platform 11, which is mounted on bed 48 by means of a dove-tailed sliding connection 51. The adjustment of the platform's position may be effected by means of an adjusting screw 52, as clearly apparent from the drawings. By means of screw 52, therefore, the block of material may be caused to advance one step towards the tools, after the completion of each longitudinal travel of the carrier, until the work on that section is completed, and the operation is transferred to an adjoining section. This requires a relative motion of the tool carrier, or a motion of the work and of the profiles in relation to the tool carrier, in a transversal direction.

In the machine represented, the transversal adjustment is effected by moving the carrier, which to this end is mounted on a platform 53, which is in its turn mounted on the bed 48 by means of a dove-tailed connection 54 in a transverse direction. The position of platform 53 may be adjusted by means of an adjusting screw 55, operated by a hand wheel 56. By means of said screw, the working section may therefore be determined, and then the operation of the machine may be started.

As above stated, in this type of machine the work is carried out by causing longitudinal (in this case up and down) travel of the carrier, while the tools are being rotated, the axial movements of the tools being controlled by their respective profiles.

The movement of the carrier, and the rotation of the tools, may be derived from the same shaft. To cause the up and down motion of the carrier, the same is mounted on four vertical uprights 57, acting as guides for its movement, and two vertical screws 58, 59, which by being rotated in one or the other direction, cause carrier 17 to travel upwardly, or downwardly along uprights 57.

The rotation of screws 58, 59, is obtained by means of worm wheels 60, 61, mounted at the base of the same, and operated by worms 62, 63, respectively, mounted on shaft 64.

Said shaft 64 is mounted on platform 53, and its rotation is caused by a gear 65 carried thereby, in mesh with a gear 66 mounted on the main shaft 67. Both shaft 64 with its gear 65, and gear 66, are carried along by platform 53, when adjusted by means of screw 55, and to this end gear 66 is slidably keyed to shaft 67, so that while constrained to follow its rotation, it is free to move in an axial sense on said shaft. At all positions of platform 53, therefore, the operation of screws 58, 59, will take place.

In a similar manner, a vertical shaft 68 is mounted on the platform 53, and on upper frame 69 carried by uprights 57, and provided with a lower bevel gear 70, in mesh with another bevel gear 71 carried by platform 53, and mounted on shaft 67 so as to be constrained to rotate therewith, but free to move axially along the same, when following the motion of platform 53.

Carrier 17 is in its turn provided with brackets 72, 73, carrying bevel gears 74, 75, coaxial with shaft 68, and slidably mounted thereon, and free therefore to follow the up or down motion of carrier 17. Said bevel gears are in mesh with bevel gears 76, 77, respectively, mounted on shafts 78, 79, carried by carrier 17, and on which are fixed worms 78, 79, 80, 81, 82, in mesh with, and operating, gears 42, 43, 44, 45, 46 respectively. The rotation of shaft 67 will, therefore, be transmitted at all times to said last mentioned gears, and through the same, simultaneously to all the tools.

When platform 53 has been set in position, and support 13 and platform 11 as well, shaft 67 may be caused to rotate in one direction, so as to cause, say, upward motion of carrier 17. When the end of the upward travel has been reached, the rotation of shaft 67 may be reversed in any suitable manner, for instance by reversing the motion of the countershaft driving the same (not shown), and the carrier 17 will start on its downward travel. At this point, however, unless suitable means are provided for at the same time reversing the operating connections between shaft 67 and shaft 68, the rotation of shaft 68, and consequently the rotation of the tools, will be reversed. The tools may of course be of a type adapted to carve or exert an abrasive action in both directions, and in this case platform 11 is fed forward one step before starting the downward motion of the carrier. If the tools, on the other hand, are adapted to work in one direction only, some arrangement may be resorted to such as mentioned, for reversing the operating connections between shaft 67 and shaft 68; or else platform 11 may be moved away from the tools, causing the downward travel (which may take place at a greater speed if desired) to be inoperative, platform 11 being replaced in operative position when the next upward travel is started.

When the work in that section has been completed, both support 13 and platform 11 are moved away from the tools, the position of platform 53 is adjusted so as to transfer the work to an adjoining section, support 13 and platform 11 are replaced in operative position, and the operation of shaft 67 is once more started.

As stated above, the apparatus which I have elected to illustrate my invention, has purposely been shown of the simplest type, where all the adjustments, feeds and reversals of movements are controlled by hand. It is obvious, however, that all such movements may be made automatic, by adopting any among a number of mechanical contrivances or arrangements, which are matter of ordinary knowledge, and at the ready command of any fairly competent designer. In no sense, therefore, must the apparatus shown be constructed as a limitation in this respect.

It is obvious, that the process may be reversed, for producing the negative in solid or in multi-profile form, from the original which has to be reproduced. In this case the model is mounted on the machine in place of the profiles, and the material out of which the negative has to be made is placed in place of block 10. If this material is a plurality of boards or slats out of which individual profiles may be obtained upon being taken apart after the operation is completed, said profiles may of course be reproduced on the same or on a different scale, by any convenient process, for instance by the photo-lithographic process, permitting of printing their outline on a sheet of paper, to be pasted on a sheet of suitable material in order to produce new profiles.

The negative to be used in performing the work may of course be produced in any well known manner; for instance, a cast of the model may be made in plaster, such as shown in Fig. 5, where 83 designates the model, and 84 the cast.

Said cast may be used to produce a negative in metal, by casting processes, the result being a metal negative such as shown in Fig. 7, designated by numeral 85.

The lines of the profiles, or of the negative or model controlling the axial motion of the tools, must be such as not to prevent the longitudinal travel of the carrier; a too sharp inclination might prevent altogether the progress of the work, and therefore, wherever a sharp turn takes place in the model, it is smoothed out in the profile or profiles, or on the negative actually used to perform the work of reproduction. At such points, suitable indications may be provided of the true profile, correction to be made by hand or otherwise, after the machine work has been completed.

To illustrate this point, cast 84 is shown reproduced in Fig. 6, with its surface at too sharp an angle for the tool to follow at several points 86, 87, 88; and in this case, recourse may be had to the expedient of filling in at such places with additional plaster, such as at 89, 90, so that the surface at such points is changed to an easier incline, making possible the cam action of said surface against the tools. The tools are preferably made with rounded rear ends, as shown in the drawings, so as to offer less resistance to the motion, and so that a more faithful rendition of the profiles may be obtained. However, for delicate work both the rear and the front ends, as well as the tracking tool or stylus, if used, for producing the profiles, should be at a rather steep slant, with rounded point, and in all cases the size of the reproducing tool should preferably be the same as that of the instrument or tool used to produce the profiles or the negative.

From the foregoing it appears that I provide a novel method for controlling the operation of cutting or carving tools, which makes hand control of the same unnecessary, and which may also be applied in producing the means from which a reproduction or reproductions have to be obtained. I also provide a novel type of profile, which I have in this description called solid profile, whereby my method may be carried into practice; and furthermore I provide a novel method of, and apparatus whereby a plurality of carving tools may be simultaneously operated, by employing the method hereinbefore referred to.

In intend to claim my invention as broadly as the previous art permits, and I reserve myself the right to carry my invention into practice in any way or manner which may enter, fairly, into the scope of the appended claims.

I claim:

1. The method of producing an inverted reproduction of the surface of a three dimensional object, which consists in successively moving an axially movable carving tool in a series of parallel planes across said surface, one of its ends being maintained against said surface and acting as tracking means, while its other end is used as carving means.

2. The method of producing an inverted reproduction of the surface of a three dimensional object, which consists in successively moving an axially movable carving tool in a series of parallel planes across said surface, while said carving tool is being rotated, one of its ends being maintained against said surface and acting as tracking means, while its other end is used as carving means.

3. The method of producing an inverted reproduction of the surface of a three dimensional object, which consists in simultaneously moving a plurality of carving tools in parallel planes across said surface, one end of each tool being maintained against said surface and acting as tracking means, while its other end is used as carving means.

4. The method of producing an inverted reproduction of the surface of a three dimensional object, which consists in simultaneously moving a plurality of carving tools in parallel planes across said surface, while said tools are being rotated, one end of each tool being maintained against said surface and acting as tracking means, while its other end is used as carving means.

5. The method of producing an inverted reproduction of the surface of a three dimensional object, which consists in simultaneously moving a plurality of carving tools transversely across said surface, and in causing said surface to control the axial movements of said tools.

6. The method of producing an inverted reproduction of the surface of a three dimensional object, which consists in simultaneously moving a plurality of carving tools transversely across said surface, while said tools are being rotated, and in causing said surface to control the axial movements of said tools.

7. The method of producing an inverted reproduction of the surface of a three dimensional object, which consists in simultaneously moving a plurality of carving tools transversely across said surface, one end of each tool being held against said surface and acting as tracking means, while its other end is used as carving means.

8. The method of producing an inverted reproduction of the surface of a three dimensional object, which consists in simultaneously moving a plurality of carving tools transversely across said surface, while said tools are being rotated, one end of each tool being held against said surface and acting as tracking means, while its other end is used as carving means.

9. The method of reproducing a three dimensional object, which consists in placing side by side a plurality of solid profiles, each being substantially an inverse reproduction of an outline of the surface thereof, so as to substantially produce the inverse of the said surface, and in using the surface thus obtained in controlling the operation of the carving tool or tools.

10. The method of reproducing a three dimensional object, which consists in placing side by side a plurality of solid profiles, each being substantially an inverse reproduction of an outline of the surface thereof, so as to substantially produce the inverse of the said surface, and in maintaining one end of a carving tool against the surface of each profile, while said tool is caused to travel along said profile.

11. The method of reproducing a three dimensional object, which consists in placing side by side a plurality of solid profiles, each being substantially an inverse reproduction of an outline of the surface thereof, so as to substantially reproduce said surface, and in causing a plurality of carving tools to simultaneously travel along said profiles, causing each profile to independently control the axial movements of the corresponding tool.

12. The method of reproducing a three dimensional object, which consists in placing side by side a plurality of solid profiles, each being substantially an inverse reproduction of an outline of the surface thereof, so as to substantially produce the inverse of the said surface, and in causing a plurality of carving tools to simultaneously travel along said profiles, while one end of each tool is maintained against the surface of the corresponding profile.

13. The method of reproducing a three dimensional object, which consists in preparing a negative copy thereof, substantially reproducing its inverted surface, and in causing a plurality of carving tools to simultaneously travel across said inverted surface of said copy, while one of the ends of each tool is maintained against said surface.

14. In a machine of the class described, the combination, with a traveling carriage, of a plurality of carving tools axially movable independently of each other carried thereby, and means simultaneously controlling the operation of said tools, during the travel of said carriage.

15. In a machine of the class described, the combination, with a traveling carriage, of a plurality of carving tools axially movable independently of each other carried thereby, means for simultaneously operating said tools, and means for controlling the individual axial travel thereof, during the travel of said carriage.

16. In a machine of the class described, the combination, with an axially movable carving tool, and a traveling carrier therefor, of means controlling the axial movement of said tool, independently of said carrier, as said carrier travels along a predetermined path, transverse to the axial movement of said tool.

17. In a machine of the class described, the combination, with a traveling carriage, and a plurality of carving tools axially movable independently of each other carried thereby, of means controlling the individual axial movements of said tools, during the travel of said carriage.

18. In a machine of the class described, the combination, with a traveling carriage, and a plurality of carving tools axially movable independently of each other carried thereby, of means simultaneously controlling the individual axial movements of said tools, during the travel of said carriage.

19. In a machine of the class described, the combination of a carriage adapted to travel in one direction, a plurality of carving tools axially movable independently of each other carried thereby, mounted at right angle to said direction, and means for adjusting the position of said carriage in a third direction.

20. In a machine of the class described, the combination of a carriage adapted to travel in one direction, a plurality of carving tools axially movable independently of each other carried thereby, mounted at right angle to said direction, and means for adjusting the position of said carriage in a third direction, also at right angle to the direction of travel of said carriage, and to the tools carried thereby.

21. In a machine of the class described, the combination, with a carriage and a plurality of carving tools carried thereby, of means causing the travel of said carriage, means simultaneously causing the operation of said tools, and stationary means controlling the axial movements of said tools independently of each other.

22. In a machine of the class described, the combination, with a carriage and a plurality of carving tools carried thereby, of means causing the travel of said carriage, and simultaneous rotation of said tools, and stationary means controlling the axial movements of said tools independently of each other.

23. In a machine of the class described, the combination, with a traveling carriage, of a plurality of carving tools carried thereby, said tools being mounted in a saw-tooth arrangement, causing their lateral distance to be less than their center-to-center distance from each other, and means operating said carriage, and simultaneously causing the rotation of said tools.

24. In a machine of the class described, the combination, with a traveling carriage, of a plurality of carving tools axially movable independently of each other carried thereby, said tools being mounted in a saw-tooth arrangement, causing their lateral distance to be less than their center-to-center distance from each other, means for simultaneously rotating said tools, and means controlling their individual movements.

25. In a machine of the class described, a vertically traveling carriage, a plurality of carving tools axially movable independently of each other carried thereby, means causing the simultaneous operation of said tools, means for adjusting the horizontal position of said carriage transversely to the direction of operation of the said tools, and means controlling the individual axial movements of said tools.

26. In a machine of the class described, a vertically traveling carriage, a plurality of carving tools axially movable independently of each other carried thereby, means controlling the axial movements of said tools, means for adjusting the horizontal position of said carriage transversely to the direction of operation of the said tools, a work supporter, and means for adjusting the horizontal position of said supporter, in relation to the said tools.

27. In a machine of the class described, a vertically traveling carriage, a plurality of carving tools axially movable independently of each other carried thereby, means causing the simultaneous rotation of said tools, means for adjusting the horizontal position of said carriage transversely to the axes of said tools, means controlling the individual axial movements of said tools, a work supporter, and means for adjusting the position of said supporter, in relation to said tools.

28. In a machine of the class described, a carriage traveling in one direction, a plurality of carving tools axially movable independently of each other carried thereby, means causing the simultaneous rotation of said tools, means for adjusting the position of said carriage at right angle to the axes of said tools, means controlling the individual axial movements of said tools, a work supporter, and means for adjusting the position of said supporter, in relation to said tools.

29. In a machine of the class described, a vertically traveling carriage, a plurality of carving tools axially movable independently of each other carried thereby, means causing the simultaneous rotation of said tools, a model controlling the individual axial movements of said tools, and means for adjusting the horizontal position of said carriage, transversely to the axes of said tools.

30. In a machine of the class described, a vertically traveling carriage, a plurality of axially movable tools carried thereby, means causing the simultaneous rotation of said tools, a stationary model controlling the axial movements of said tools, means for adjusting the horizontal position of said carriage, transversely to the axes of said tools, and means maintaining said tools with one of their ends against the surface of said model.

31. In a machine of the class described, a vertically traveling carriage, a plurality of axially movable carving tools carried thereby, means causing the simultaneous rotation of said tools, means for adjusting the horizontal position of said carriage transversely to the axes of the said tools, a stationary model controlling the axial movements of said tools, means maintaining said tools with one of their ends against the surface of said model, a work supporter, and means for adjusting the position of said supporter in relation to the said tools.

MARIO SCHIESARI.